United States Patent
Williamson

(10) Patent No.: US 11,676,290 B2
(45) Date of Patent: Jun. 13, 2023

(54) METHOD, APPARATUS, AND COMPUTER PROGRAM PRODUCT FOR ENSURING CONTINUITY OF FEATURES BETWEEN SPATIALLY PARTITIONED MAPS

(71) Applicant: HERE GLOBAL B.V., Eindhoven (NL)

(72) Inventor: Dennis Scott Williamson, Wheaton, IL (US)

(73) Assignee: HERE GLOBAL B.V., Eindhoven (NL)

( * ) Notice: Subject to any disclaimer, the term of this patent is extended or adjusted under 35 U.S.C. 154(b) by 202 days.

(21) Appl. No.: 17/303,151

(22) Filed: May 21, 2021

(65) Prior Publication Data

US 2022/0375107 A1   Nov. 24, 2022

(51) Int. Cl.
  *G06T 7/32*  (2017.01)
  *G06T 3/00*  (2006.01)
  *G06T 7/73*  (2017.01)
  *G06T 7/33*  (2017.01)

(52) U.S. Cl.
  CPC .............. *G06T 7/32* (2017.01); *G06T 3/0068* (2013.01); *G06T 7/33* (2017.01); *G06T 7/73* (2017.01)

(58) Field of Classification Search
  None
  See application file for complete search history.

(56) References Cited

U.S. PATENT DOCUMENTS

| | | | |
|---|---|---|---|
| 10,185,775 B2 | 1/2019 | Schmalstieg et al. | |
| 10,217,232 B2 | 2/2019 | Harada | |
| 11,557,053 B2* | 1/2023 | Zhang | G06T 11/60 |
| 2010/0299370 A1 | 11/2010 | Otto | |
| 2014/0267234 A1* | 9/2014 | Hook | G06T 19/006 345/419 |
| 2019/0317239 A1 | 10/2019 | Olsson et al. | |
| 2021/0183122 A1* | 6/2021 | Ramani | G06T 11/00 |
| 2023/0003548 A1* | 1/2023 | Schwartz | G01C 21/3889 |

OTHER PUBLICATIONS

Ullah et al., "Automatic 360° Mono-Stereo Panorama Generation Using a Cost-Effective Multi-Camera System", Sensors, 20(11), (May 30, 2020), 22 pages.

* cited by examiner

*Primary Examiner* — James A Thompson
(74) *Attorney, Agent, or Firm* — Alston & Bird LLP

(57) ABSTRACT

A method is provided to ensure continuity of features through spatially partitioned maps. Methods may include: identifying a map element extending from a first map tile to a second map tile; determining a first set of continuous features of the map element in the first map tile; determining a second set of continuous features of the map element in the second map tile; identifying a first set of locations in a plane separating the first map tile from the second map tile where the first set of continuous features intersect the plane; identifying a second set of locations where the second set of continuous features intersect the plane; correlating the first set of continuous features with the second set of continuous features; blending the first and second set of continuous features; and updating map data including the first map tile and the second map tile with a blended map element.

20 Claims, 7 Drawing Sheets

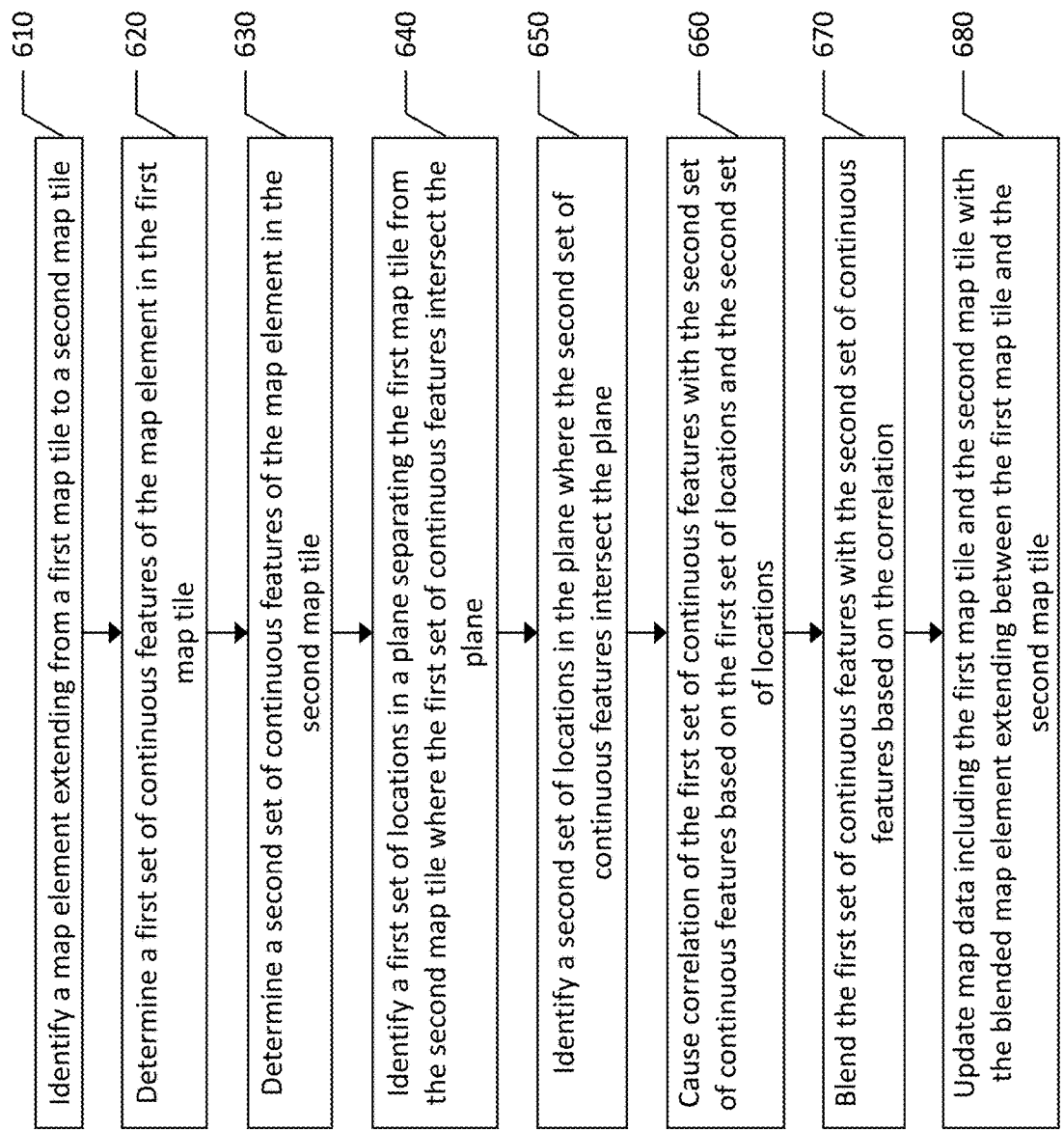

METHOD, APPARATUS, AND COMPUTER PROGRAM PRODUCT FOR ENSURING CONTINUITY OF FEATURES BETWEEN SPATIALLY PARTITIONED MAPS

TECHNOLOGICAL FIELD

An example embodiment of the present disclosure relates to ensure continuity of features between spatially partitioned maps, and more particularly, to reconciling continuous features broken along partition boundaries to reduce misalignment, overlaps, and gaps such that endpoints at partition edges are coincident or can be unambiguously correlated.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps are partitioned to provide manageable portions of the map that can be used for localized updates, caching at mobile devices, and various other processing functions that benefit from finite sections of the map being processed independently. Partitioning of these digital maps poses other challenges, some of which are overcome by embodiments described herein.

BRIEF SUMMARY

A method, apparatus, and computer program product are provided in accordance with an example embodiment for ensuring continuity of features between spatially partitioned maps, and more particularly, to reconciling continuous features broken along partition boundaries to reduce misalignment, overlaps, and gaps such that endpoints at partition edges are coincident or can be unambiguously correlated. Embodiments provided herein include an apparatus having at least one processor and at least one memory including computer program code with the at least one memory and computer program code being configured to, with the processor, cause the apparatus to: identify a map element extending from a first map tile to a second map tile; determine a first set of continuous features of the map element in the first map tile; determine a second set of continuous features of the map element in the second map tile; identify a first set of locations in a plane separating the first map tile from the second map tile where the first set of continuous features intersect the plane; identify a second set of locations in the plane where the second set of continuous features intersect the plane; cause correlation of the first set of continuous features with the second set of continuous features based on the first set of locations and the second set of locations; blend the first set of continuous features with the second set of continuous features based on the correlation of the first set of continuous features with the second set of continuous features to obtain a blended map element; and update map data including the first map tile and the second map tile with the blended map element extending between the first map tile and the second map tile.

According to some embodiments, each of the first set of locations and the second set of locations include feature attribution information associated with continuous features intersecting the plane. The map element extending from the first map tile to the second map tile is a road in some embodiments. The feature attribution information may include one or more of: road marking type, road marking color, road barrier, and road boundary. Causing the apparatus of some embodiments to cause correlation of the first set of continuous features with the second set of continuous features based on the first set of locations and the second set of locations includes causing the apparatus to: cause correlation of the first set of continuous features with the second set of continuous features based on the first set of locations and the second set of locations and based on the feature attributions of the first set of locations and the second set of locations.

According to some embodiments, causing the apparatus to cause correlation of the first set of continuous features with the second set of continuous features based on the first set of locations and the second set of locations further includes causing the apparatus to: cause correlation of at least one of the first set of locations with a respective at least one of the second set of locations to generate at least one correlated pair; and determine transformations between the first set of continuous features and the second set of continuous features to reduce a distance between the at least one correlated pair. Causing the apparatus of some embodiments to determine transformations between the first set of continuous features and the second set of continuous features to reduce a distance between the at least one correlated pair includes causing the apparatus to perform least squares optimization to determine two-dimensional transformations in the plane between the first set of continuous features and the second set of continuous features to reduce the distance between the at least one correlated pair.

Embodiments provided herein include a computer program product including at least one non-transitory computer-readable storage medium having computer-executable program code instructions stored therein, the computer-executable program code instructions including program code instructions to: identify a map element extending from a first map tile to a second map tile; determine a first set of continuous features of the map element in the first map tile; determine a second set of continuous features of the map element in the second map tile; identify a first set of locations in a plane separating the first map tile from the second map tile, where the first set of continuous features intersect the plane; identify a second set of locations in the plane where the second set of continuous features intersect the plane; cause correlation of the first set of continuous features with the second set of continuous features based on the first set of locations and the second set of locations; blend the first set of continuous features with the second set of continuous features based on the correlation of the first set of continuous features with the second set of continuous features to obtain a blended map; and update map data including the first map tile and the second map tile with the blended map element extending between the first map tile and the second map tile.

According to some embodiments, each of the first set of locations and the second set of locations include feature attribution information associated with continuous features intersecting the plane. The map element extending from the first map tile to the second map tile, in some embodiments, is a road. The feature attribution information may include one or more of: a road marking type, a road marking color, a road barrier, and a road boundary. The program code instructions to cause correlation of the first set of continuous features with the second set of continuous features based on the first set of locations and the second set of locations optionally includes program code instructions to: cause correlation of the first set of continuous features with the second set of continuous features based on the first set of locations and the second set of locations and based on the feature attributions of the first set of locations and the second set of locations.

The program code instructions to cause correlation of the first set of continuous features with the second set of continuous features based on the first set of locations and the second set of locations optionally includes program code instructions to: cause correlation of at least one of the first set of locations with a respective at least one of the second set of locations to generate correlated pairs; and determine transformations between the first set of continuous features and the second set of continuous features to reduce a distance between the correlated pairs. The program code instructions to determine transformations between the first set of continuous features and the second set of continuous features to reduce a distance between the correlated pairs may include program code instructions to perform least squares optimization to determine two-dimensional transformations in the plan between the first set of continuous features and the second set of continuous features to reduce the distance between the correlated pairs.

Embodiments provided herein include a method including: identifying a map element extending from a first map tile to a second map tile; determining a first set of continuous features of the map element in the first map tile; determining a second set of continuous features of the map element in the second map tile; identifying a first set of locations in a plane separating the first map tile from the second map tile where the first set of continuous features intersect the plane; identifying a second set of locations in the plane where the second set of continuous features intersect the plane; causing correlation of the first set of continuous features with the second set of continuous features based on the first set of locations and the second set of locations; blending the first set of continuous features with the second set of continuous features based on the correlation of the first set of continuous features with the second set of continuous features to obtain a blended map element; and updating map data including the first map tile and the second map tile with the blended map element extending between the first map tile and the second map tile.

According to some embodiments, each of the first set of locations and the second set of locations include feature attribution information associated with continuous features intersecting the plane. The map element extending from the first map tile to the second map tile includes a road in some embodiments; the feature attribution information of some embodiments includes one or more of a road marking type, a road marking color, a road barrier, and a road boundary.

According to some embodiments, causing correlation of the first set of continuous features with the second set of continuous features based on the first set of locations and the second set of locations optionally includes causing correlation of the first set of continuous features with the second set of continuous features based on the first set of locations and the second set of locations and based on the feature attributions of the first set of locations and the second set of locations. According to some embodiments, causing correlation of the first set of continuous features with the second set of continuous features based on the first set of locations and the second set of locations optionally includes: causing correlation of at least one of the first set of locations with a respective at least one of the second set of locations to generate correlated pairs; and determining transformations between the first set of continuous features and the second set of continuous features to reduce a distance between the correlated pairs.

Embodiments provided herein include an apparatus including: means for identifying a map element extending from a first map tile to a second map tile; means for determining a first set of continuous features of the map element in the first map tile; means for determining a second set of continuous features of the map element in the second map tile; means for identifying a first set of locations in a plane separating the first map tile from the second map tile where the first set of continuous features intersect the plane; means for identifying a second set of locations in the plane where the second set of continuous features intersect the plane; means for causing correlation of the first set of continuous features with the second set of continuous features based on the first set of locations and the second set of locations; means for blending the first set of continuous features with the second set of continuous features based on the correlation of the first set of continuous features with the second set of continuous features to obtain a blended map element; and means for updating map data including the first map tile and the second map tile with the blended map element extending between the first map tile and the second map tile.

According to some embodiments, each of the first set of locations and the second set of locations include feature attribution information associated with continuous features intersecting the plane. The map element extending from the first map tile to the second map tile includes a road in some embodiments; the feature attribution information of some embodiments includes one or more of a road marking type, a road marking color, a road barrier, and a road boundary.

According to some embodiments, the means for causing correlation of the first set of continuous features with the second set of continuous features based on the first set of locations and the second set of locations optionally includes means for causing correlation of the first set of continuous features with the second set of continuous features based on the first set of locations and the second set of locations and based on the feature attributions of the first set of locations and the second set of locations. According to some embodiments, the means for causing correlation of the first set of continuous features with the second set of continuous features based on the first set of locations and the second set of locations optionally includes: means for causing correlation of at least one of the first set of locations with a respective at least one of the second set of locations to generate correlated pairs; and means for determining transformations between the first set of continuous features and the second set of continuous features to reduce a distance between the correlated pairs.

BRIEF DESCRIPTION OF THE DRAWINGS

Figure 1:
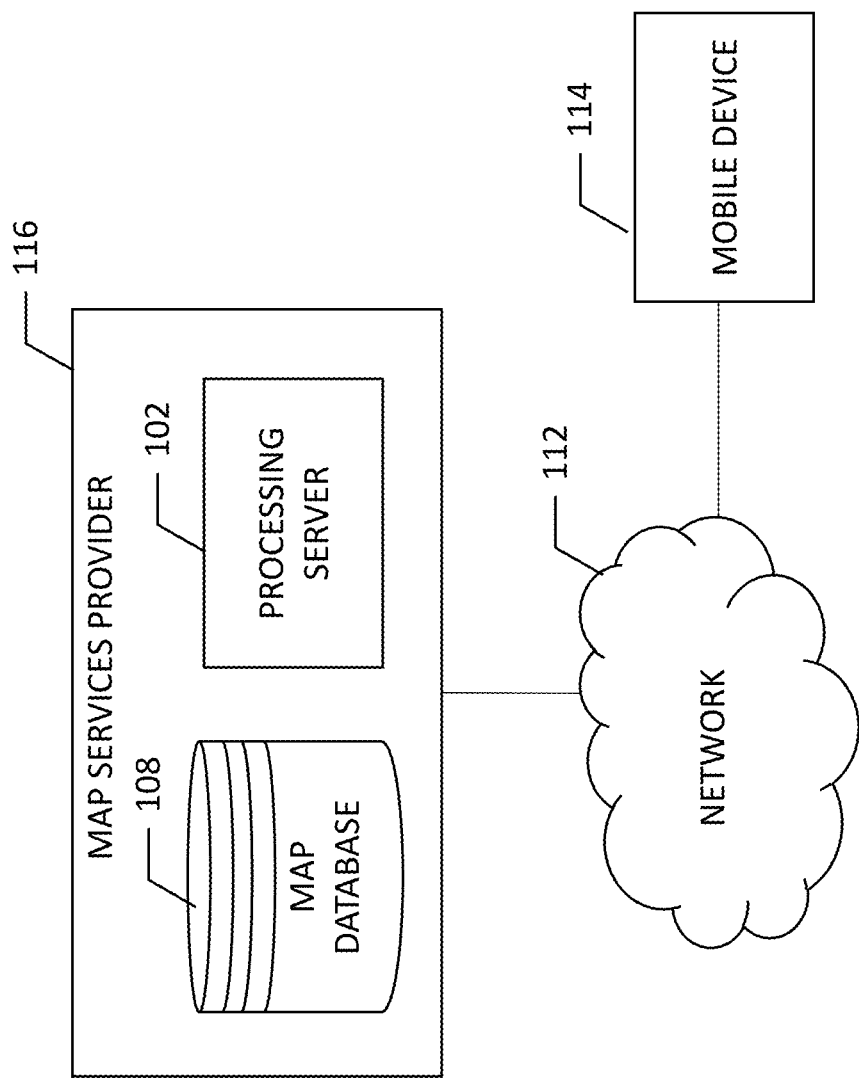
Figure 2:
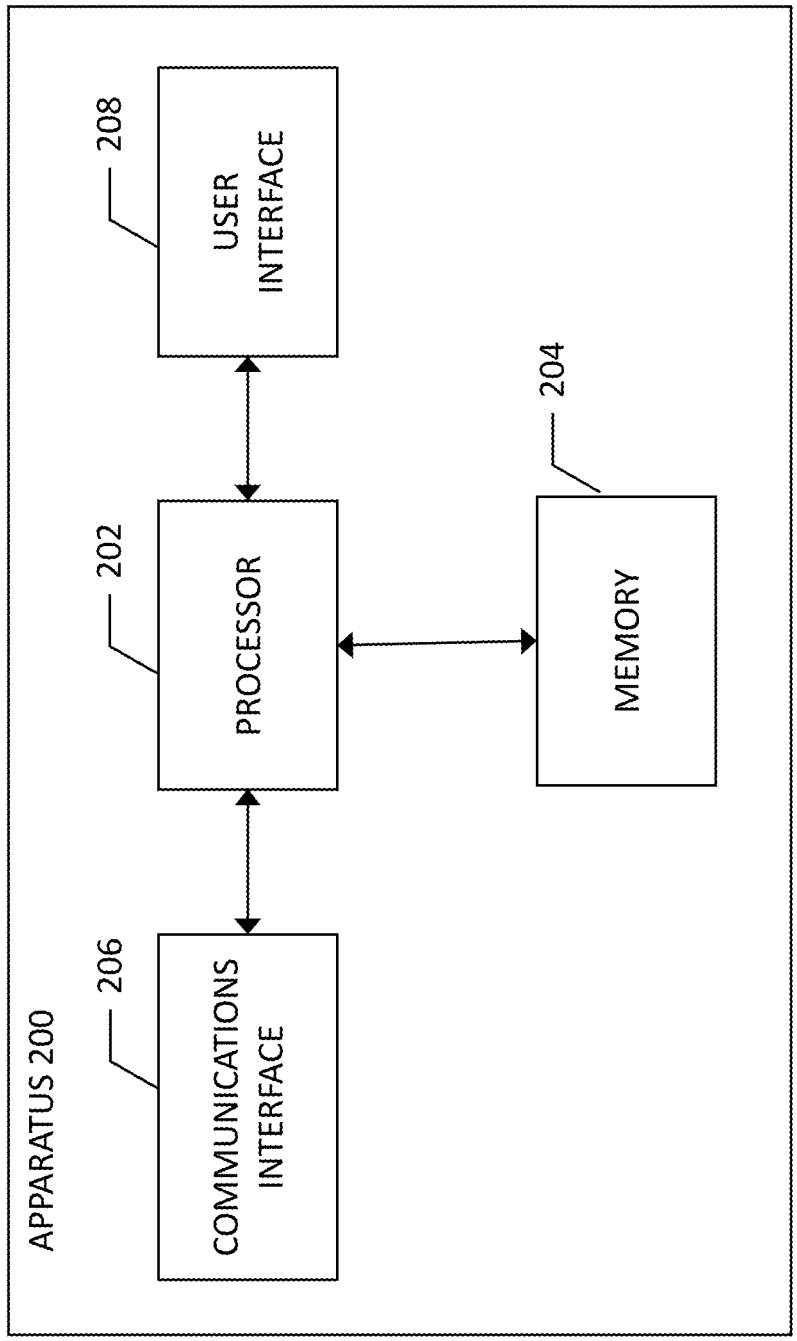
Figure 3:
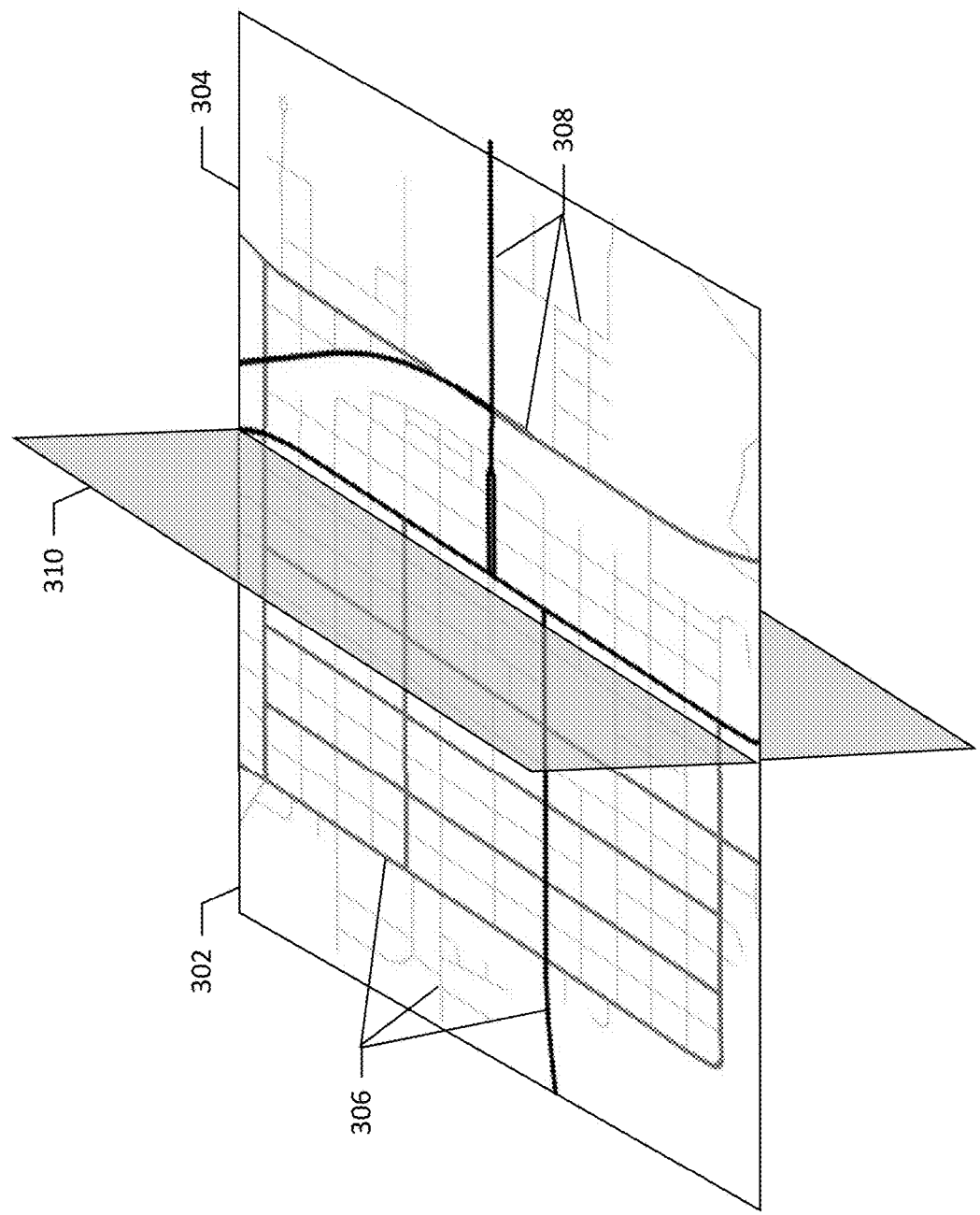
Figure 4:
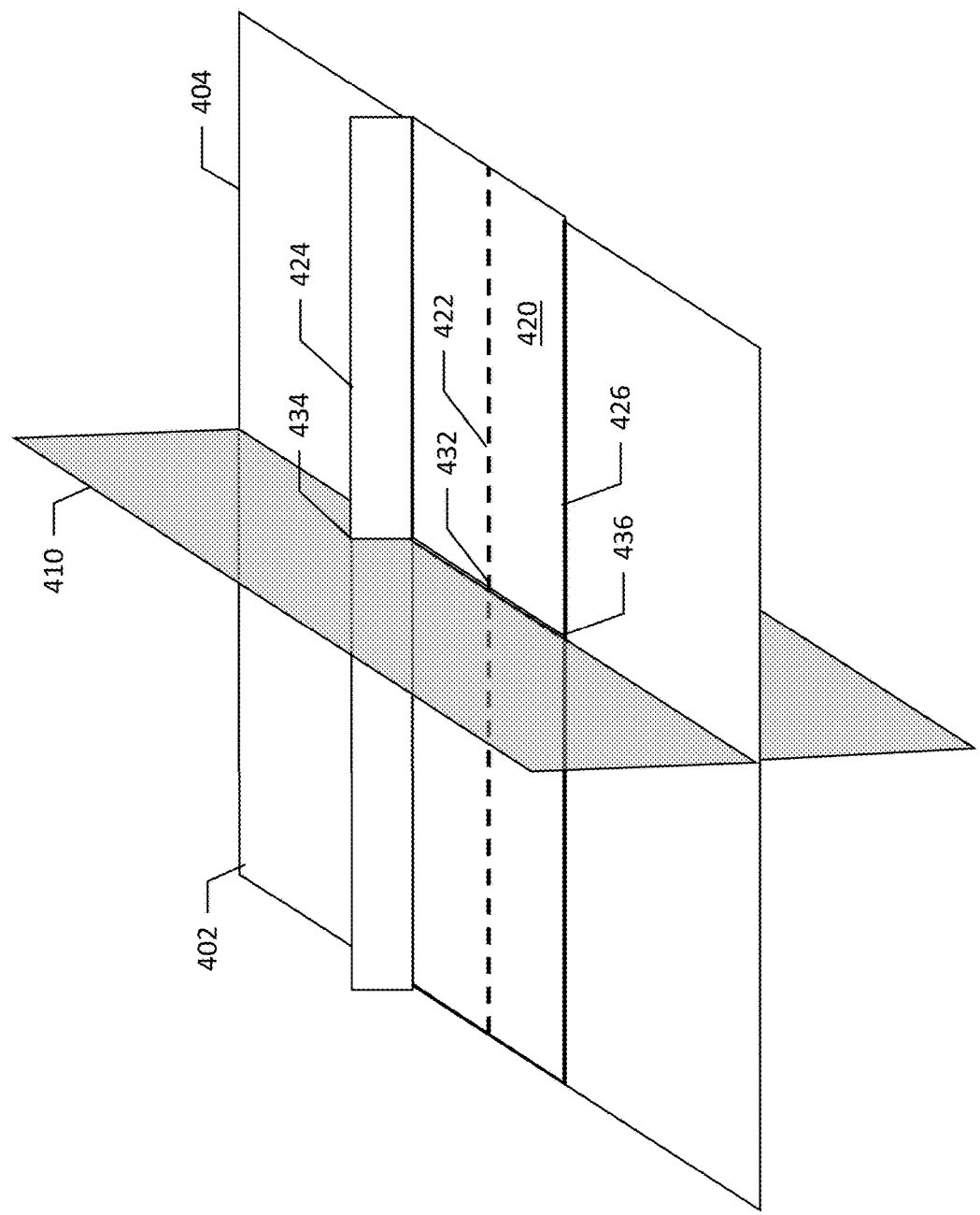
Figure 5:
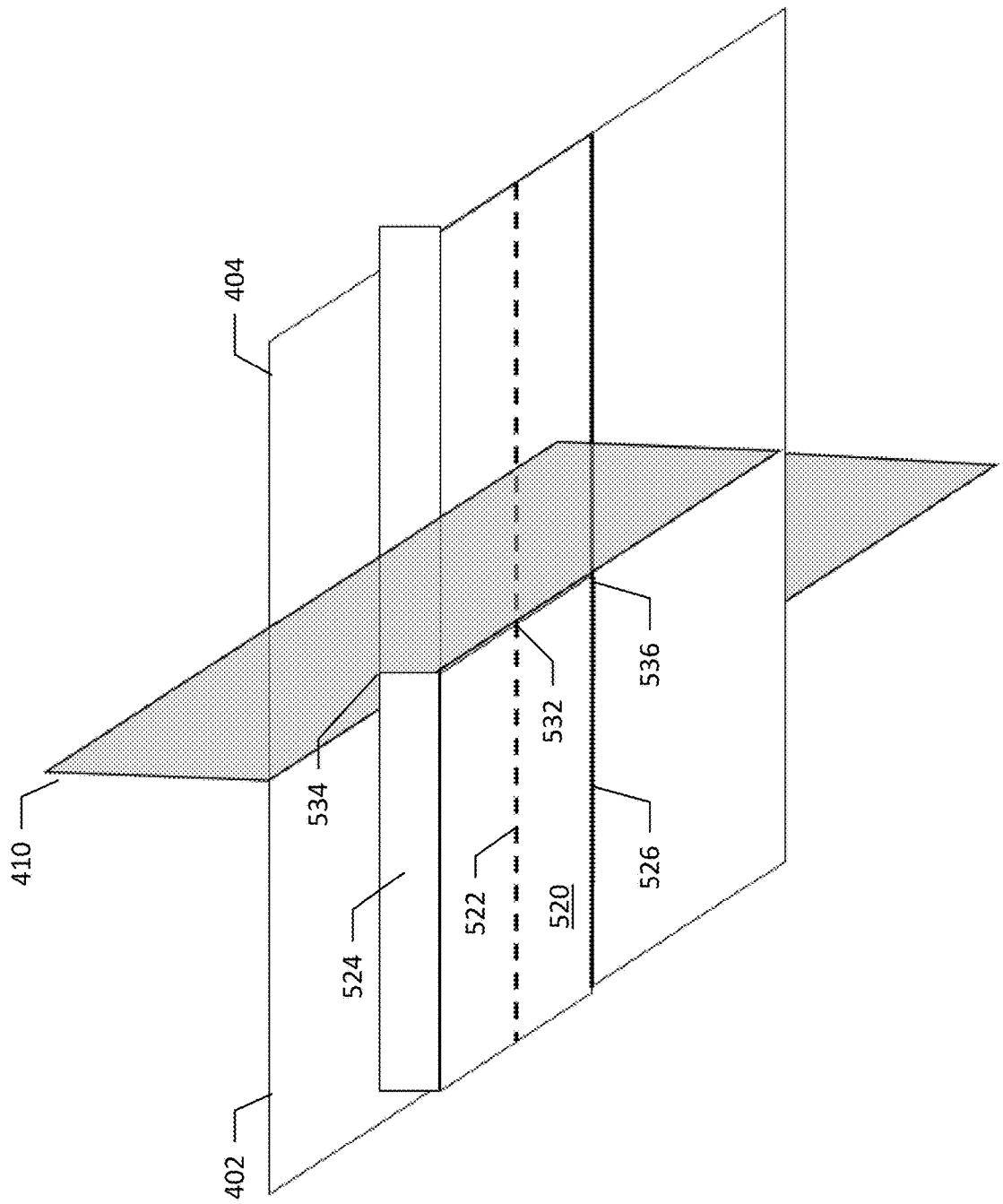
Figure 6:
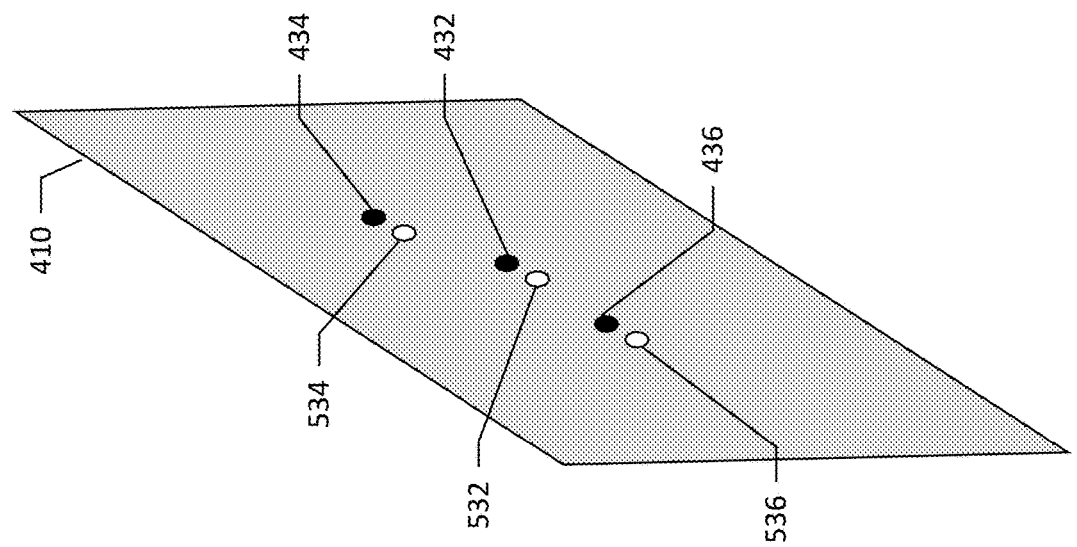

Having thus described example embodiments of the disclosure in general terms, reference will now be made to the accompanying drawings, which are not necessarily drawn to scale, and wherein:

FIG. 1 illustrates a communication diagram of a system for implementing example embodiments described herein according to an example embodiment of the present disclosure;

FIG. 2 is a block diagram of an apparatus for ensuring continuity of map features across map tile boundaries according to an example embodiment of the present disclosure;

FIG. 3 depicts two map tiles including shared map elements separated by a plane according to an example embodiment of the present disclosure;

FIG. 4 illustrates a close-up view of a single road segment in a second map tile that extends into a first map tile crossing through a plane according to an example embodiment of the present disclosure;

FIG. 5 illustrates a different perspective of close-up view of a single road segment of FIG. 4 according to an example embodiment of the present disclosure;

FIG. 6 illustrates the plane of FIGS. 4 and 5 including intersection points of continuous features with the plane according to an example embodiment of the present disclosure; and FIG. 7 is a flowchart of a method for ensuring continuity of features through spatially partitioned maps according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for ensuring continuity of features between spatially partitioned maps, and more particularly, to reconciling continuous features broken along partition boundaries to reduce misalignment, overlaps, and gaps such that endpoints at partition edges are coincident or can be unambiguously correlated. Digital maps such as HD maps can span entire continents rendering them very large data files that are unmanageable in their entirety such that these digital maps are spatially partitioned. While digital maps can be spatially partitioned using geographic boundaries, digital maps can be alternatively or additionally partitioned spatially into tiles where tiles can be processed individually or as groups of tiles to generate map updates, to provide navigational assistance or autonomous vehicle control, or to otherwise process map data without requiring the entirety of a digital map or a region of a digital map. These spatial partitions may be based, for example, on latitude and longitude and may break down a geographic area into manageable size portions of the map. As digital maps may include an abundance of rich information, such as point-of-interest information, highly-detailed road geometry information (e.g., to facilitate autonomous vehicle control), road restrictions, sign information, traffic or other dynamic information, etc., the amount of data associated with a spatially partitioned section of the map may be very large. Thus, spatial partitions provide manageable chunks of the mapped region.

Spatially partitioning of digital maps and processing of these spatially partitioned portions, referred to herein as "tiles" or "map tiles", can present issues of consistency between adjacent tiles when the tiles are not processed together. When map tiles are processed, such as when manual or automated work is performed within a map tile without taking special care to include neighboring data and to ensure continuous features remain continuous across tile boundaries, discontinuities can occur. Because these map tiles may contain an abundance of data associated with the mapped region of the tile, it may be cumbersome to consider all neighboring tiles when processing a particular map tile. Without considering all neighboring tiles when processing a particular map tile, discontinuities can occur where features that are continuous across partitions in the real world become broken across partition boundaries in the digital map. Embodiments described herein reconcile continuous features broken along partition lines to reduce misalignment, overlaps, and gaps such that endpoints at partition edges are coincident and/or can be unambiguously correlated across the partition.

FIG. 1 illustrates a communication diagram of an example embodiment of a system for implementing example embodiments described herein. The illustrated embodiment of FIG. 1 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous across spatial partitions between map tiles as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments described herein ensure continuity of features between spatially partitioned map tiles to ensure the integrity of the digital map is maintained. According to an example embodiment as shown in FIG. 3, a first map tile—map tile 302, may be separated from a second map tile—map tile 304, by a plane 310. In an ideally flat, two-dimensional map scenario, the map tiles may be separated by a line; however, given uneven terrain, changes in elevation, and road features at different elevations relative to the road (e.g., curbs and barricades) map tiles are more consistently separated by a plane extending through the boundary of the map tiles. Further, while the illustrated embodiment depicts tiles that are rectangles, the map tiles of example embodiments may include any shape, such as squares, hexagons, combinations of hexagons and pentagons, triangles, etc. The shape of the tiles is not material to example embodiments describe herein.

Within the first map tile 302 and the second map tile 304, there exist distinct collections of roads 306 and 308 respectively, where each road is a collection of continuous features, such as road edges, lane markings, barriers, etc. For each road that exists in the first tile 302 and the second tile 304, there exists a collection of three-dimensional continuous features associated with the road. A single road may have a plurality of continuous features, such as lines or splines for a raised curb, lines or splines for road markings, lines or splines for barriers, etc. Within the first map tile 302 a given road that extends into the second map tile 304 includes a collection of two-dimensional and/or three-dimensional continuous features in the first tile: t1=[a1, a2, a3 . . . ] (e.g., polylines or splines) associated with the road. Within the second map tile 304, the road that extends from the first tile 302 includes a collection of three-dimensional continuous features in the second tile: t2=[b1, b2, b3 . . . ] associated with the roads.

All continuous features that extend from the first map tile 302 to the second map tile 304 intersect the plane 310. An optional extension may be applied to all continuous features to ensure that they extend into the plane 310 and are detected. An example embodiment of an extension may include where a driveway, existing on a plane boundary, interrupts a continuous road edge. By projecting the road edge features to the plane, and possibly correlating them then blending the results back, a more consistent representation of the road would exist on either side of the driveway across the plane boundary. For each continuous feature that intersects the plane 310, the point of intersection in the plane is recorded along with the continuous feature attribution information useful for associating endpoints to endpoints including type (e.g., road boundary, lane marking, barrier, etc.) and additional attributes (e.g., lane marking color, marking line time (dashed/solid), barrier height, etc. These feature attribution information may be recorded as [pa1, pa2, pa3 . . . ] and [pb1, pb2, pb3 . . . ] indicating plane intersection points of the respective continuous features.

FIG. 4 illustrates an example embodiment of a close-up view of a single road segment 420 in a second map tile 404 that extends into a first map tile 402 crossing through plane 410. The three-dimensional continuous features of the road segment 420 include a road centerline 422 that is a dashed-type line of a color (e.g., yellow or white), a road edge line 426 that is of a solid-type line of a color (e.g., yellow or white), and a barrier 424. The road centerline of the second map tile 404 may correspond to feature b1 above, the road edge line may correspond to feature b2 above, and the barrier may correspond with feature b3 above. The three-dimensional continuous features each intersect with the plane 410 between the first map tile 402 and the second map tile 404. The first feature b1 of the road centerline 422 intersects the plane 410 at pb1 at 432 with a location in the plane. The second feature b2 of the road edge line 426 intersects the plane 410 at pb2 at 436 with a location in the plane. The third feature b3 of the barrier 424 intersects the plane 410 at pb3 at 434.

FIG. 5 illustrates a close-up view of the single road segment from the perspective of the first map tile 402. As shown, the road segment 520 includes a road centerline 522 that is a dashed-type line of a color (e.g., yellow or white), a road edge line 526 that is of a solid-type line of a color (e.g., yellow or white), and a barrier 524. The road centerline in the first map tile 402 may correspond to feature a1 above, the road edge line may correspond to feature a2 above, and the barrier may correspond with feature a3 above. The three-dimensional continuous features each intersect with the plane 410 between the first map tile 402 and the second map tile 404. The first feature a1 of the road centerline 522 intersects the plane 410 at pa1 at 532 with a location in the plane. The second feature a2 of the road edge line 526 intersects the plane 410 at pa2 at 536 with a location in the plane. The third feature a3 of the barrier 524 intersects the plane 410 at pa3 at 534.

The intersection points of the features of road segment that exists in both the first map tile 402 and the second map tile 404 are mapped to the plane 410 as shown in FIG. 6. While the intersection points shown in FIGS. 4 and 5 appear closely aligned between the features (e.g., pa1=pb1), FIG. 6 illustrates a condition where the feature intersection points with the plane are not closely aligned. As shown, pa1 (point 532) does not align identically with pb1 (point 432). Similarly, pa2 (point 534) does not align identically with pb2 (point 434) and pa3 (point 536) does not align identically with pb3 (point 436). Thus, a discontinuity exists between the features that extend between the first map tile 402 and the second map tile 404. To correct this issue, the feature intersection points with the plane [pa1, pa2, pa3] and [pb1, pb2, pb3] are associated using relative arrangement and attribution features as a guide. Not all points require association. When a plurality of intersection points are in proximity to one another, correlation between intersection points to ensure the proper feature from a first map tile is correlated to the corresponding feature of the second map tile can include an assessment of the feature attribution information, such that a road boundary is not inadvertently correlated with a road line, for example. Further, if a correlation between two intersection points cannot be definitively determined based on feature attribution information, the translations of the points may be performed before correlation of the intersection points to bring intersection points more closely into alignment for informing embodiments described herein of the proper points in the plane to correlate.

To associate feature intersection points of features from a first map tile with features from a second map tile, bundle adjustment or other least-squares optimization may be performed on the corresponding point pairs to discover two-dimensional transformations Ta and Tb within the plane 410 that, when applied to associated intersection points [pa1, pa2, pa3] and [pb1, pb2, pb3] minimize the distance error between the associated points and overall distance error from the initial position. For best results, transformations include translation, rotation, scale, and skew (with a 3×3 matrix), but may be simplified to reduce computation if desired and if the discontinuities are not too substantial. The translations may be applied, such as by applying Ta to all feature intersection points [pa1, pa2, pa3] and by applying Tb to all feature intersection points [pb1, pb2, pb3]. Transformations are to be applied to all points, even those with no associations. A feature intersection point from a first map tile may not be associated with a feature intersection point from a second map tile, but after transformation, the feature intersection point that was not previously associated may be associated with a feature intersection point from an adjacent map tile that falls within a predefined similarity (e.g., location, feature type, etc.) to become associated. For features that required extension to reach the plane 410, the blended result may influence the original continuous feature without artificially extending it to meet the plane, and any extensions may be discarded.

The use of transformations to align correlated feature intersection points (e.g., pa1 to pb1, pa2 to pb2, etc.) can be used to blend or smooth discontinuities between map elements in different map tiles. The blending or smoothing of a map element across tile boundaries can be used to update a map database, such as map database 108 of FIG. 1. This map building and repairing can improve the transition between map tiles for road elements which can improve autonomous vehicle guidance and navigational assistance, for example.

FIG. 7 illustrates a flowchart depicting a method according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 7. The illustrated method may be performed, for example, by apparatus 200 using processor 202 with program code instructions stored in memory 204 to cause the apparatus to perform the operations of the method of FIG. 3. As shown, the apparatus is caused to identify a map element extending from a first map tile to a second map tile at 610. This map element may be, for example, a road that extends into both the first map tile and the second map tile. At 620, a first set of continuous map features of the map element in the first map tile are determined. These continuous map features may include, for example, lane lines, road markings, road barriers, road boundaries, etc. A second set of continuous features of the map element in the second map tile is identified at 630. A first set of locations are identified at 640 in a plane separating the first map tile from the second map tile where the first set of continuous features intersect the plane. At 650 a second set of locations in the plane are identified where the second set of continuous features intersect the plane. Correlation is caused at 660 of the first set of continuous features with the second set of continuous features based on the first set of locations and the second set of locations. The first set of continuous features are blended at 670 with the second set of continuous features responsive to the correlation. The blended map element generated from the blending is used to update map data including the first map tile and the second map tile at 680. This map data may be stored in a map database, such as map database 108, for use in guiding autonomous vehicles or for providing navigational assistance, for example.

In an example embodiment, an apparatus for performing the method of FIG. 7 above may include a processor (e.g., the processor 202) configured to perform some or each of the operations (210-220 or 510-560) described above. The processor may, for example, be configured to perform the operations (210-220 or 510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-220 or 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    identify a map element extending from a first map tile to a second map tile;
    determine a first set of continuous features of the map element in the first map tile;
    determine a second set of continuous features of the map element in the second map tile;
    identify a first set of locations in a plane separating the first map tile from the second map tile where the first set of continuous features intersect the plane;
    identify a second set of locations in the plane where the second set of continuous features intersect the plane;
    cause correlation of the first set of continuous features with the second set of continuous features based on the first set of locations and the second set of locations;
    blend the first set of continuous features with the second set of continuous features based on the correlation of the first set of continuous features with the second set of continuous features to obtain a blended map element; and
    update map data including the first map tile and the second map tile with the blended map element extending between the first map tile and the second map tile.

2. The apparatus of claim 1, wherein the first set of locations and the second set of locations each comprise feature attribution information associated with continuous features intersecting the plane.

3. The apparatus of claim 2, wherein the map element extending from the first map tile to the second map tile comprises a road.

4. The apparatus of claim 3, wherein the feature attribution information includes one or more of: road marking type, road marking color, road barrier, and road boundary.

5. The apparatus of claim 4, wherein causing the apparatus to cause correlation of the first set of continuous features with the second set of continuous features based on the first set of locations and the second set of locations further comprises causing the apparatus to:
    cause correlation of the first set of continuous features with the second set of continuous features based on the first set of locations and the second set of locations and based on the feature attributions of the first set of locations and the second set of locations.

6. The apparatus of claim 1, wherein causing the apparatus to cause correlation of the first set of continuous features with the second set of continuous features based on the first set of locations and the second set of locations further comprises causing the apparatus to:
    cause correlation of at least one of the first set of locations with a respective at least one of the second set of set of locations to generate at least one correlated pair; and
    determine transformations between the first set of continuous features and the second set of continuous features to reduce a distance between the at least one correlated pair.

7. The apparatus of claim 6, wherein causing the apparatus to determine transformations between the first set of continuous features and the second set of continuous features to reduce a distance between the at least one correlated pair comprises causing the apparatus to perform least squares optimization to determine two-dimensional transformations in the plane between the first set of continuous features and the second set of continuous features to reduce the distance between the at least one correlated pair.

8. A computer program product comprising at least one non-transitory computer-readable storage medium having computer-executable program code instructions stored therein, the computer-executable program code instructions comprising program code instructions to:
    identify a map element extending from a first map tile to a second map tile;
    determine a first set of continuous features of the map element in the first map tile;
    determine a second set of continuous features of the map element in the second map tile;
    identify a first set of locations in a plane separating the first map tile from the second map tile where the first set of continuous features intersect the plane;
    identify a second set of locations in the plane where the second set of continuous features intersect the plane;
    cause correlation of the first set of continuous features with the second set of continuous features based on the first set of locations and the second set of locations;
    blend the first set of continuous features with the second set of continuous features based on the correlation of the first set of continuous features with the second set of continuous features to obtain a blended map element; and
    update map data including the first map tile and the second map tile with the blended map element extending between the first map tile and the second map tile.

9. The computer program product of claim 8, wherein the first set of locations and the second set of locations each comprise feature attribution information associated with continuous features intersecting the plane.

10. The computer program product of claim 9, wherein the map element extending from the first map tile to the second map tile comprises a road.

11. The computer program product of claim 10, wherein the feature attribution information includes one or more of: a road marking type, a road marking color, a road barrier, and a road boundary.

12. The computer program product of claim 11, wherein the program code instructions to cause correlation of the first set of continuous features with the second set of continuous features based on the first set of locations and the second set of locations further comprises program code instructions to:
cause correlation of the first set of continuous features with the second set of continuous features based on the first set of locations and the second set of locations and based on the feature attributions of the first set of locations and the second set of locations.

13. The computer program product of claim 8, wherein the program code instructions to cause correlation of the first set of continuous features with the second set of continuous features based on the first set of locations and the second set of locations further comprise program code instructions to:
cause correlation of at least one of the first set of locations with a respective at least one of the second set of set of locations to generate correlated pairs; and
determine transformations between the first set of continuous features and the second set of continuous features to reduce a distance between the correlated pairs.

14. The computer program product of claim 13, wherein the program code instructions to determine transformations between the first set of continuous features and the second set of continuous features to reduce a distance between the correlated pairs comprise program code instructions to perform least squares optimization to determine two-dimensional transformations in the plane between the first set of continuous features and the second set of continuous features to reduce the distance between the correlated pairs.

15. A method comprising:
identifying a map element extending from a first map tile to a second map tile;
determining a first set of continuous features of the map element in the first map tile;
determining a second set of continuous features of the map element in the second map tile;
identifying a first set of locations in a plane separating the first map tile from the second map tile where the first set of continuous features intersect the plane;
identifying a second set of locations in the plane where the second set of continuous features intersect the plane;
causing correlation of the first set of continuous features with the second set of continuous features based on the first set of locations and the second set of locations;
blending the first set of continuous features with the second set of continuous features based on the correlation of the first set of continuous features with the second set of continuous features to obtain a blended map element; and
updating map data including the first map tile and the second map tile with the blended map element extending between the first map tile and the second map tile.

16. The method of claim 15, wherein the first set of locations and the second set of locations each comprise feature attribution information associated with continuous features intersecting the plane.

17. The method of claim 16, wherein the map element extending from the first map tile to the second map tile comprises a road.

18. The method of claim 17, wherein the feature attribution information includes one or more of: a road marking type, a road marking color, a road barrier, and a road boundary.

19. The method of claim 18, wherein causing correlation of the first set of continuous features with the second set of continuous features based on the first set of locations and the second set of locations further comprises:
causing correlation of the first set of continuous features with the second set of continuous features based on the first set of locations and the second set of locations and based on the feature attributions of the first set of locations and the second set of locations.

20. The method of claim 15, wherein causing correlation of the first set of continuous features with the second set of continuous features based on the first set of locations and the second set of locations further comprises:
causing correlation of at least one of the first set of locations with a respective at least one of the second set of set of locations to generate correlated pairs; and
determining transformations between the first set of continuous features and the second set of continuous features to reduce a distance between the correlated pairs.

* * * * *

UNITED STATES PATENT AND TRADEMARK OFFICE
CERTIFICATE OF CORRECTION

PATENT NO. : 11,676,290 B2
APPLICATION NO. : 17/303151
DATED : June 13, 2023
INVENTOR(S) : Dennis Scott Williamson It is certified that error appears in the above-identified patent and that said Letters Patent is hereby corrected as shown below:

In the Claims

In Column 16, Line 26, Claim 6, delete "set of set of" and insert -- set of --, therefor.

In Column 17, Line 28, Claim 13, delete "set of set of" and insert -- set of --, therefor.

In Column 18, Lines 43-44, Claim 20, delete "set of set of" and insert -- set of --, therefor.

Signed and Sealed this
Twenty-sixth Day of December, 2023

Katherine Kelly Vidal
*Director of the United States Patent and Trademark Office*